United States Patent
Honeyman et al.

(10) Patent No.: US 12,372,496 B2
(45) Date of Patent: Jul. 29, 2025

(54) METHODS OF MEASURING HARVESTED CROP MATERIAL

(71) Applicant: AGCO Corporation, Duluth, GA (US)

(72) Inventors: Friedrich Robert Honeyman, Hesston, KS (US); Kevin J. Hamilton, Newton, KS (US); Brian Busenitz, Hesston, KS (US)

(73) Assignee: AGCO Corporation, Duluth, GA (US)

(*) Notice: Subject to any disclaimer, the term of this patent is extended or adjusted under 35 U.S.C. 154(b) by 361 days.

(21) Appl. No.: 17/906,769

(22) PCT Filed: Mar. 25, 2021

(86) PCT No.: PCT/IB2021/052488
§ 371 (c)(1),
(2) Date: Sep. 20, 2022

(87) PCT Pub. No.: WO2021/214572
PCT Pub. Date: Oct. 28, 2021

(65) Prior Publication Data
US 2023/0358707 A1    Nov. 9, 2023

Related U.S. Application Data

(60) Provisional application No. 63/015,219, filed on Apr. 24, 2020.

(51) Int. Cl.
*G01N 27/60* (2006.01)
*A01D 34/00* (2006.01)

(52) U.S. Cl.
CPC ......... *G01N 27/605* (2013.01); *A01D 34/006* (2013.01)

(58) Field of Classification Search
CPC .. G01N 27/605; G01N 27/223; A01D 34/006; A01D 43/085; A01D 41/1271;
(Continued)

(56) References Cited

U.S. PATENT DOCUMENTS

| | | | |
|---|---|---|---|
| 3,430,357 A | 3/1969 | Weyerhaeuser | |
| 3,739,264 A * | 6/1973 | Resh | G01R 27/2658 340/636.15 |

(Continued)

FOREIGN PATENT DOCUMENTS

| | | |
|---|---|---|
| AU | 2019201061 A1 | 9/2019 |
| DE | 4105857 A1 | 8/1992 |

(Continued)

OTHER PUBLICATIONS

S. O. Nelson, "Sensing moisture content in grain," in IEEE Instrumentation & Measurement Magazine, vol. 3, No. 1, pp. 17-20, Mar. 2000 (Year: 2000).*

(Continued)

*Primary Examiner* — Daniel R Miller

(57) ABSTRACT

A method of measuring a harvested crop includes measuring a first attribute of a first electric field in a first volume containing crop material, measuring a second attribute of a second electric field in a second volume containing crop material, and determining at least two different properties of the crop material based at least in part on the first attribute and the second attribute.

14 Claims, 5 Drawing Sheets

(58) Field of Classification Search
CPC .. A01D 41/127; A01D 41/1277; A01D 43/00; A01D 43/0631; G01F 1/86
See application file for complete search history.

(56) References Cited

U.S. PATENT DOCUMENTS

| | | | |
|---|---|---|---|
| 5,101,163 | A | 3/1992 | Agar |
| 5,560,246 | A | 10/1996 | Bottinger et al. |
| 5,572,160 | A | 11/1996 | Wadell |
| 5,708,369 | A | 1/1998 | Horn |
| 5,835,054 | A | 11/1998 | Warhus et al. |
| 5,930,988 | A | 8/1999 | Hanson |
| 6,121,782 | A | 9/2000 | Adams et al. |
| 6,215,293 | B1 | 4/2001 | Yim |
| 6,421,990 | B1 * | 7/2002 | Ohlemeyer ........ G01N 21/3563 356/328 |
| 6,487,836 | B1 * | 12/2002 | Coers ................ A01D 41/1274 460/7 |
| 6,512,475 | B1 | 1/2003 | Bogatyrev et al. |
| 6,806,821 | B2 | 10/2004 | McLemore |
| 7,068,050 | B2 | 6/2006 | Steele et al. |
| 7,298,312 | B2 | 11/2007 | McLemore |
| 7,307,575 | B2 | 12/2007 | Zemany |
| 7,448,880 | B2 | 11/2008 | Osaka |
| 10,290,948 | B2 | 5/2019 | Hoffman et al. |
| 10,371,558 | B2 | 8/2019 | Tevs et al. |
| 10,408,645 | B2 | 9/2019 | Blank et al. |
| 10,448,570 | B2 | 10/2019 | Graeve et al. |
| 2001/0054903 | A1 * | 12/2001 | Adams ................ G01N 27/223 324/667 |
| 2003/0146767 | A1 | 8/2003 | Steele et al. |
| 2004/0077943 | A1 | 4/2004 | Meaney et al. |
| 2004/0100285 | A1 | 5/2004 | Rains |
| 2004/0190377 | A1 | 9/2004 | Lewandowski et al. |
| 2006/0176062 | A1 | 8/2006 | Yang et al. |
| 2013/0088245 | A1 | 4/2013 | Sezginer |
| 2015/0285752 | A1 | 10/2015 | Kozicki et al. |
| 2018/0325028 | A1 | 11/2018 | Rotole et al. |
| 2018/0325029 | A1 | 11/2018 | Rotole et al. |
| 2018/0325031 | A1 | 11/2018 | Rotole et al. |
| 2019/0021229 | A1 | 1/2019 | Treffer et al. |
| 2019/0110394 | A1 | 4/2019 | Van Nahmen |

FOREIGN PATENT DOCUMENTS

| | | |
|---|---|---|
| EP | 0 843 959 A1 | 5/1998 |
| EP | 2927675 A1 | 10/2015 |
| GB | 2196129 A | 4/1988 |
| GB | 2295897 A | 6/1996 |
| JP | H09145432 A | 6/1997 |
| WO | 2021/214572 A1 | 10/2021 |
| WO | 2021214580 A1 | 10/2021 |

OTHER PUBLICATIONS

Nurzharina Binti Abd. Karim & Idris Bin Ismail, Soil Moisture Detection Using Electrical Capacitance Tomography (ECT) Sensor, May 2011; 6 pages.

UK Intellectual Property Office, Search report for related UK Application No. GB2006618.9, dated Nov. 3, 2020; 4 pages.

European Patent Office, International Search Report related to International Patent Application No. PCT/IB2021/052488 , mail date Jun. 7, 2021; 12 pages.

Georg Kormann: Untersuchungen zur Integration kontinuierlich arbeitender Feuchtemesssysteme in ausgewählte Futtererntemaschinen11 , Dissertation, May 18, 2001 (May 18, 2001), XP055654213, pp. 9-18.

* cited by examiner

METHODS OF MEASURING HARVESTED CROP MATERIAL

CROSS-REFERENCE TO RELATED APPLICATION APPLICATIONS

This application is a national phase entry under 35 U.S.C. § 371 of International Patent Application PCT/IB2021/052488, filed Mar. 25, 2021 designating the United States of America and published in English as International Patent Publication WO 2021/214572 A1 on Oct. 28, 2021 which claims the benefit of the filing date of U.S. Provisional Patent Application 63/015,219, "Methods of Measuring Harvested Crop Material," filed Apr. 24, 2020, the entire disclosure of which is incorporated herein by reference.

FIELD

Embodiments of the present disclosure relate generally to machines and methods of harvesting crops. In particular, embodiments relate to methods and apparatus for determining the properties of harvested crops.

BACKGROUND

Windrowers and other self-propelled harvesters have long been used to harvest crops for hay and forage. A conventional windrower includes a laterally extending header supported by a windrower chassis. As the windrower is advanced through a field, the header severs a swath of standing forage plants, such as grasses, alfalfa, wheat, etc. The header also collects the severed forage material and discharges the material rearwardly onto the ground in the form of a windrow extending behind the windrower. Windrowers can employ different types of headers, including sickle headers and rotating disc headers.

The windrow is typically allowed to dry for a period of time, after which the crop is collected and baled. Various factors affect how quickly the cut crop material dries, such as crop moisture, ground moisture, windrow dimensions and density, and crop crimping. To produce high quality bales, the crop should be baled when moisture levels are within certain ranges (which vary by the type of crop). Moisture levels too high can lead to mold or other damage during storage, whereas moisture levels too low can cause excess nutrient loss before baling and difficulty forming coherent bales.

It would be beneficial to have an efficient way to determine the physical properties of the crop material harvested, including mass and moisture levels, to enable farmers to make better agronomic decisions about processing the crop.

BRIEF SUMMARY

In some embodiments, a method of measuring a harvested crop includes measuring a first attribute of a first electric field in a first volume containing crop material, measuring a second attribute of a second electric field in a second volume containing crop material, and determining at least two different properties of the crop material based at least in part on the first attribute and the second attribute.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
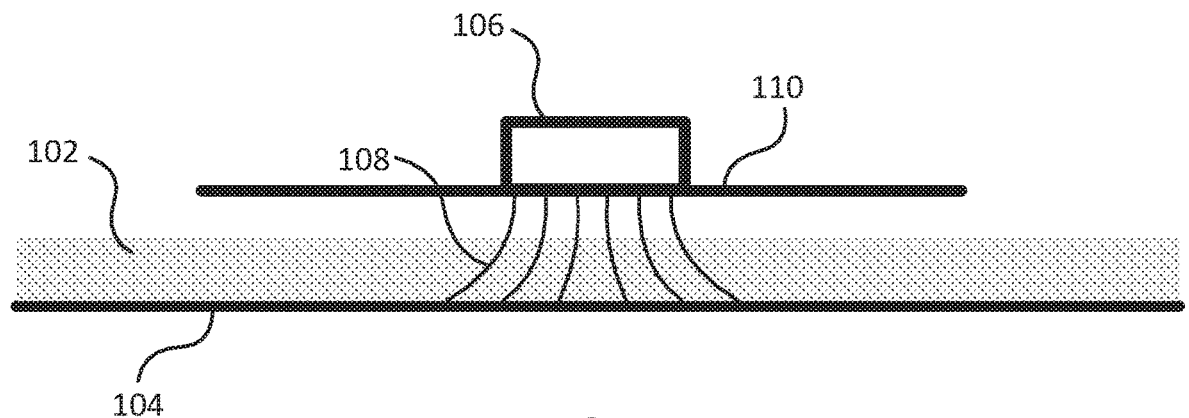
FIG. 1 is a simplified side view illustrating a sensor for measuring a harvested crop.

All references cited herein are incorporated herein in their entireties. If there is a conflict between definitions herein and in an incorporated reference, the definition herein shall control.

The illustrations presented herein are not actual views of any tillage implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 is a simplified diagram illustrating a device and method for measuring a harvested crop. In some embodiments, crop material 102 may be laying on a ground surface 104. In other embodiments, the crop material 102 may be laying or traveling on a surface of a machine (e.g., a baler, a combine harvester, etc.). In yet other embodiments, the crop material 102 may be measured as it is being cut. A measuring device 106 measures an attribute of an electric field 108 that interacts with the crop material 102. The measuring device 106 may be within or carried by a frame 110 of an agricultural machine, such as a windrower, a baler, a combine harvester, a harvesting header, etc.

The measuring device 106 may itself generate the electric field 108 and may be operable to change the electric field 108. The electric field 108 has a response curve, i.e., its attributes vary in a particular way in response to different conditions. For example, the electric field 108 may have a field strength that decreases in proportion to $1/r^2$ or $1/r^3$, where r is the distance from the measuring device 106. The presence of the crop material 102 may change a measurable attribute of the electric field 108. For example, if the electric field 108 is formed by electromagnetic radiation having a frequency that excites water molecules, moisture within the crop material 102 can affect the field lines of the electric field 108. Thus, the shape of the field lines may be the measurable attribute of the electric field 108, which may be detected by the measuring device 106. A change in the amount of moisture in the crop material 102—or a change in the amount (mass) of crop material 102—may change the shape of the field lines. The crop material 102 may cause a change in the electrical load provided by the measuring device 106 to generate the electric field 108.

The mass of crop material 102 and total moisture in the crop material are related: $M_T = m \times MC$, where $M_T$ is the total moisture in the measurement volume, m is the mass of the crop material 102 in the measurement volume, and MC is moisture content of the crop material 102. The total moisture in the measurement volume can be detected based on the measured attribute of the electric field 108. However, without additional information, neither the mass of the crop material 102 nor the moisture content of the crop material 102 can be determined from the total moisture.

Figure 2:
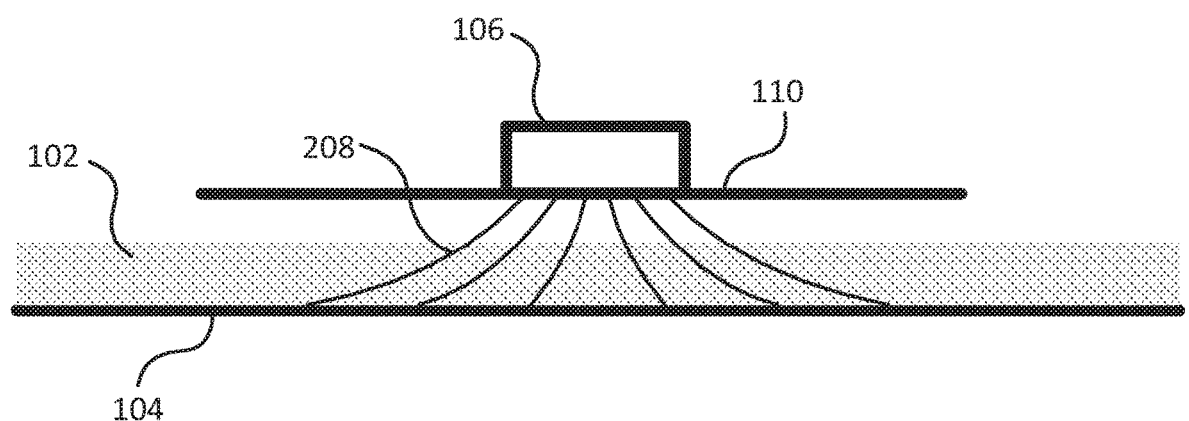
FIG. 2 is another simplified side view of the sensor of FIG. 1.

The measuring device 106 may generate a second electric field 208, as shown in FIG. 2, which may have a different volume than the electric field 108 (or, if both fields 108, 208 are theoretically boundless, the second electric field 208 may have a different response curve). That is, even with the same amount and type of crop material 102 in the volume near the measuring device 106, the electric field 208 in FIG. 2 may nonetheless be different than the electric field 108 shown in FIG. 1. The electric field 208 may vary based on a different variable (or combination of variables) than the electric field 108. For example, the shape of the field lines of the electric field 208 may vary based on the mass of the crop material 102 in the electric field 208. Thus, the measuring device 106 may detect two different variables, and these two variables may be used to determine two different properties of the crop material 102. If two different properties of the crop material 102 are calculated, confidence in the accuracy of the properties (or at least in one of the properties) is increased.

Though described as measuring attributes of two different electric fields 108, 208, the measuring device 106 may measure attributes of any number of electric fields. By determining additional independent attributes, other variables may be determined or derived, even if the variables are dependent on one or more of the variables already determined. Interrelated variables may generally be determined with sufficient independent information (e.g., three independent variables may be used to determine three different properties). Determination of mass and total moisture in the electric fields 108, 208 may be combined with a ground speed of the machine or linear speed of the crop material 102 to determine mass flow and total moisture flow. Other properties that may be determined include, for example, the position of a top surface of the crop material 102 relative to the frame 110, a thickness of the crop material 102, and a density of the crop material 102.

In some embodiments, the electric field 108 may be formed by a transmitter powered by a power source within the measuring device 106. If the crop material 102 within the electric field 108 changes, the amount of power transmitted, and the amount of power drawn from the power source, may change. Thus, the measuring device 106 may measure the power draw to correlate to the property of the crop material 102. In some embodiments, the attributes of electric fields 108, 208 may be measured by measuring permittivity of the crop material 102.

The crop material 102 may be measured as it is harvested by an agricultural machine, meaning that the crop material 102 is cut shortly before or as the measuring device 106 passes the electric field 108 near the crop material 102. In some embodiments, the crop material 102 may be measured before being cut.

Though the crop material 102 is described herein as being "within the electric field," a person having ordinary skill in the art will understand that electric fields are theoretically infinite, decaying to smaller field strength as distance increases. Thus, the term "within the electric field" herein means within a preselected volume relevant to the electric field, which may be defined by a threshold field strength, physical space boundaries, etc.

Figure 3:
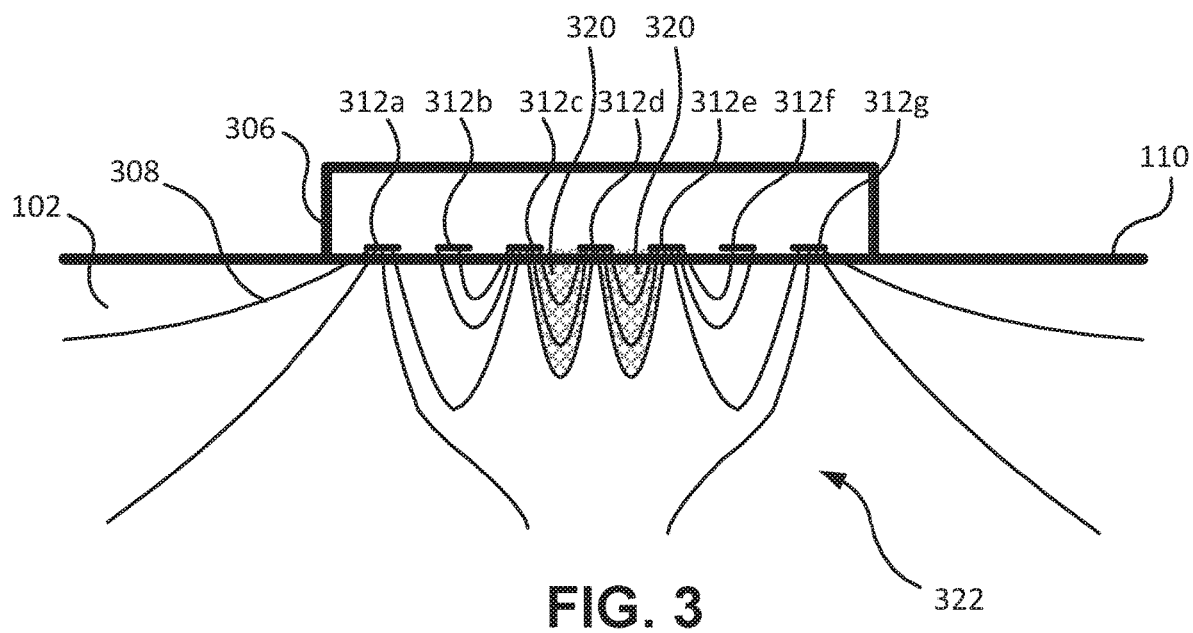
FIG. 3 is a simplified side view illustrating another sensor for measuring a harvested crop.
Figure 4:
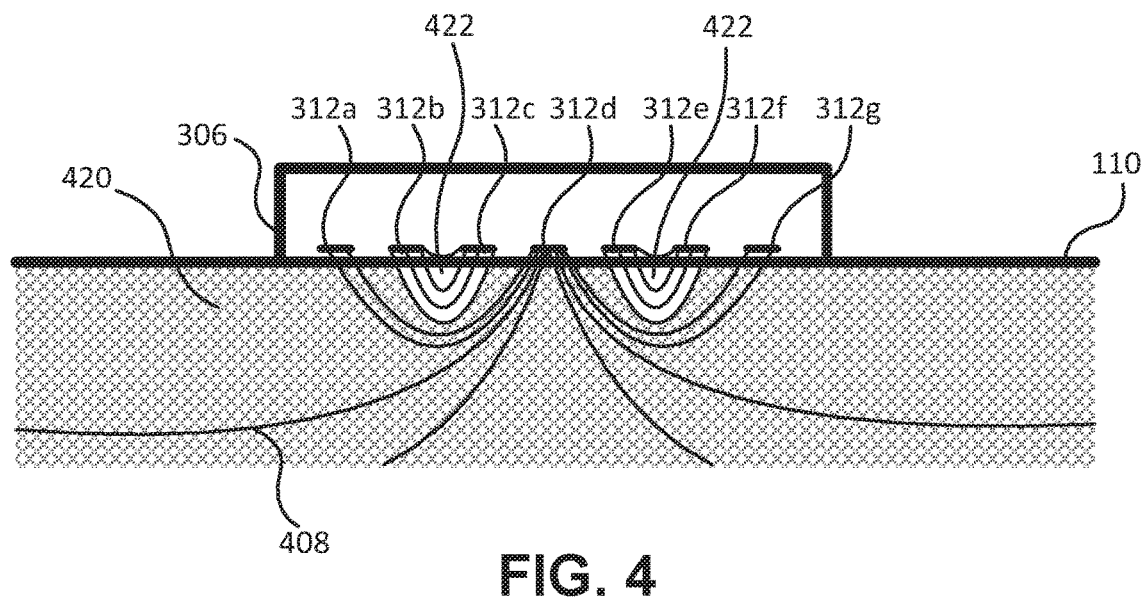
FIG. 4 is another simplified side view of the sensor of FIG. 3.

FIGS. 3 and 4 illustrate another measuring device 306 that may be used for measuring a harvested crop 102. As shown, the measuring device 306 may be within or carried by a frame 110 of an agricultural machine. The measuring device 306 may contain a plurality of electrodes 312 arranged in an array (e.g., a linear or planar array). For example, FIGS. 3 and 4 depict a measuring device 306 having seven electrodes 312a-312g in a linear array, though another number of electrodes 312 may be used. The electrodes 312 may be connected to a power source such that an electric field having field lines 308 forms between and adjacent to the electrodes 312 and the surroundings. In FIG. 3, the center electrode 312d is an electrical sink, and each adjacent electrode 312c, 312e is an electrical source. The remaining electrodes 312a, 312b, 312f, and 312g are grounded. Thus, some field lines 308 connect the electrical sources to the electrical sink, and other field lines 308 connect the shielding electrodes 312a, 312b, 312f, and 312g to one another or to ground. The field lines 308 associated with the shielding electrodes 312a, 312b, 312f, and 312g shield the electrical sources and the electrical sink limit the effects of material within those field lines 308. The hatched area in FIG. 3 indicates a measurement volume 320 in which material can affect the field lines 308 related to the electrical sources and electrical sink. The material within the measurement volume 320 can affect the magnitude of electric current flowing from the electrical sources to the electrical sink, and the material within a shielded volume 322 (i.e., the area not hatched in FIG. 3) cannot. The measuring device 306 may include a measurement of the current flow from the electrical sources to the electrical sink. As the properties of the material within the measurement volume 320 changes, so too may the current. For example, the measuring device 306 may measure a resonant frequency of crop material within the measurement volume 320. As the crop material therein changes, the resonant frequency may change or "drift," which is associated with different physical properties of the crop material. Note that the crop material 102 is omitted from view in FIG. 3 for clarity, as is the ground surface 104 (see FIG. 1).

FIG. 4 illustrates the same measuring device 306, in which electrical connections of some electrodes 312 have been changed. In FIG. 4, the center electrode 312d is an electrical sink, and the outermost electrodes 312a, 312g are electrical sources. The remaining electrodes 312b, 312c, 312e, and 312f are grounded. Thus, an electric field having field lines 408 forms between and adjacent to the electrodes 312 and the surroundings. Some field lines 408 connect the electrical sources to the electrical sink, and other field lines 408 connect the shielding electrodes 312b, 312c, 312e, and 312f to one another. The field lines 408 associated with the shielding electrodes 312b, 312c, 312e, and 312f shield the electrical sources and the electrical sink limit the effects of material within those field lines 408. The hatched area in FIG. 4 indicates a measurement volume 420 (extending theoretically to infinity) in which material can affect the field lines related to the electrical sources and electrical sink. The material within the measurement volume 420 can affect the magnitude of electric current flowing from the electrical sources to the electrical sink, and the material within a shielded volume 422 (i.e., the area not hatched in FIG. 4) cannot. Because the measurement volume 420 shown in FIG. 4 is different from the measurement volume 320 shown in FIG. 3, the measuring device 306 may be configurable to yield two different properties of the material therein without physically moving or changing the measuring device 306 or the material flow. These two properties may be used to calculate physical properties relevant to operation of the agricultural machine carrying the measuring device 306.

As shown, the volume 420 is different from the volume 320, but may partially overlap. That is, some points may be within both the volume 320 and the volume 420, and other points may be within one volume 320, 420, but not the other. In certain embodiments, a larger volume in which crop material is measured may be the sum of two or more smaller volumes, and one of the smaller volumes may be measured separately for comparison. For example, in FIG. 3, the shaded volume 320 may be the smaller volume, and the entire volume below the frame 110 may be the larger volume. Alternatively, in FIG. 4, the shaded volume 420 may be the smaller volume, and the entire volume below the frame 110 may be the larger volume. In some embodiments, the volume in which crop material 102 is measured may be coextensive with different electric fields. In the embodiment shown in FIGS. 1 and 2, the measuring device 106 may measure crop material 102 in a certain predefined volume with both fields, though the fields may have different field lines 108, 208.

FIGS. 1 and 2 illustrate one way the measuring device 106 may be used to measure a material property of the crop material 102 by measuring signal attenuation or apparent load on the measuring device 106. That is, the measuring device 106 transmits a signal to generate the electric field, and measures the power output, which may vary based on a property (e.g., permittivity) of the crop material 102 in the field. FIGS. 3 and 4 illustrate one way the measuring device 306 may be used to measure received signal strength, resonant frequency, and/or frequency drift as a measure of a material property. Other measuring devices may use other parameters, such as capacitance, as a measure of material properties, and multiple of such other parameters may likewise be used to determine multiple physical properties of crop material, even if those physical properties are interrelated. In some embodiments, combinations of sensors may be used to measure additional properties.

Figure 5:
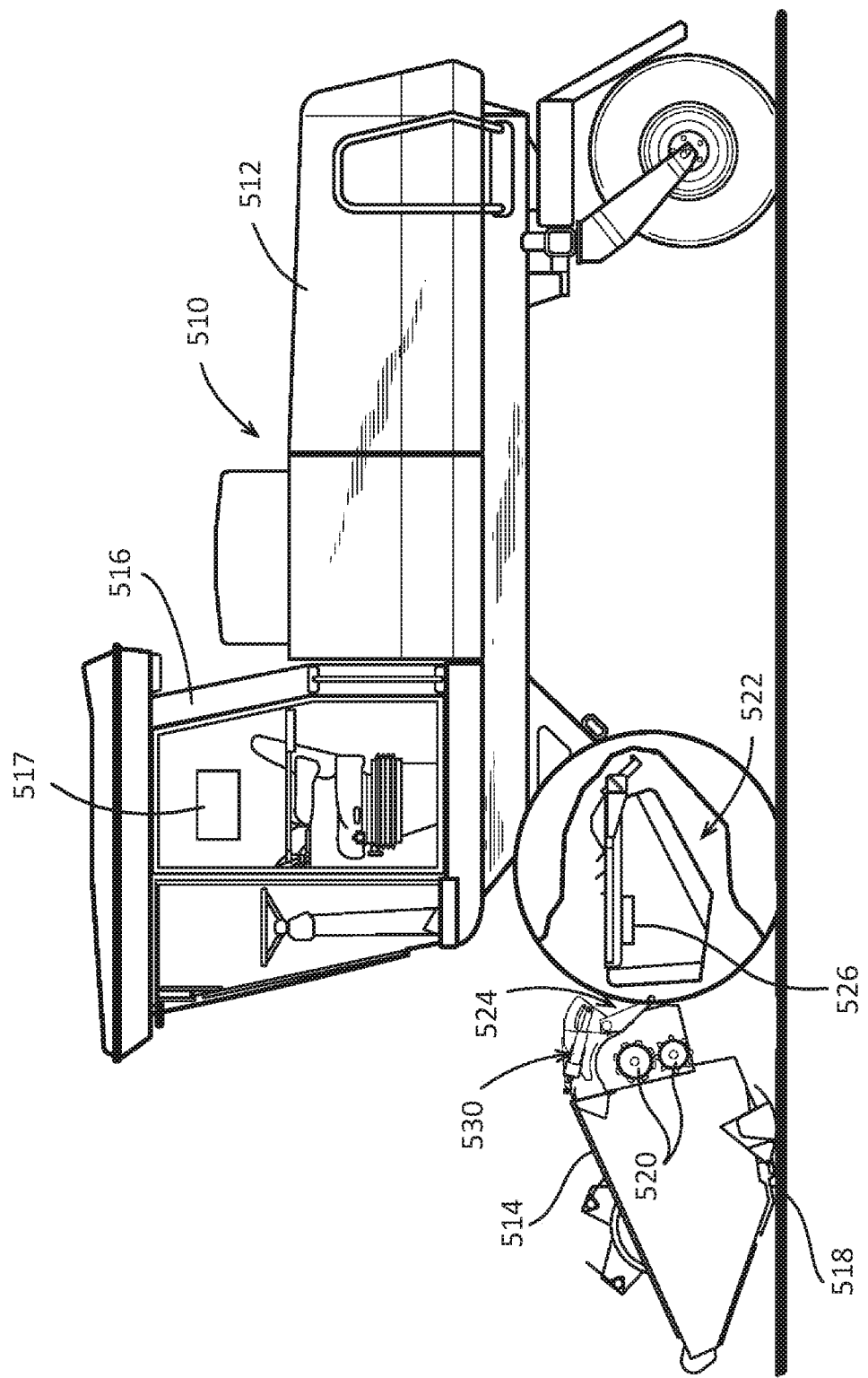
FIG. 5 is a simplified side view of a windrower, which may include the sensors shown in FIGS. 1 through 4.

FIG. 5 is a simplified side view of an example self-propelled windrower 510. In some embodiments, pull-type or other types of harvesting machines may be used. The windrower 510 broadly includes a self-propelled tractor 512 and a harvesting header 514 attached to and carried by the front of the tractor 512. An operator drives the windrower 510 from a cab 516, which includes an operator station having a tractor seat and one or more user interfaces (e.g., FNR joystick, display monitor, switches, buttons, etc.) that enable the operator to control various functions of the tractor 512 and header 514. In one embodiment, a controller 517 or computing system is disposed in the cab 516, though in some embodiments, the controller 517 may be located elsewhere or include a distributed architecture having plural computing devices, coupled to one another in a network, throughout various locations within the tractor 512 (or in some embodiments, located in part externally and in remote communication with one or more local computing devices).

The header 514 includes a cutter 518, a conditioning system, a swathboard 524, and a forming shield assembly 522. The cutter 518 is configured for severing standing crops as the windrower 510 moves through the field. The conditioning system, in the depicted embodiment, includes one or more pairs of conditioner rolls 520. The forming shield assembly 522 may include a pair of rearwardly converging windrow forming shields located behind the conditioner rolls 520. The swathboard 524 is located between the conditioner rolls 520 and the forming shield assembly 522. In some embodiments, the conditioning system may be of a different design, such as a flail-type conditioning system. In self-propelled harvesters, the forming shields 522 are typically supported partly by the header 514 and partly by the tractor 512, while in pull-type harvesters the forming shields are typically carried by the header only. In some embodiments, the forming shield assembly may be differently configured (e.g., using a single shield or additional shields of the same or different geometric configuration) to form harvested crop into a windrow having a selected width or shape. The swathboard 524 and/or the forming shield assembly 522 may be adjusted by one or more actuators 530.

A measuring device 526 may be carried by the windrower 510 or the header 514 such that it can measure the crop material being cut by the header 514 and formed into a windrow. The measuring device 526 may communicate with the controller 517 such that the controller 517 can change operating parameters of the windrower 510 and/or the header 514 (e.g., a position of one or more of the actuators 530). In some embodiments, the measuring device 526 may report information to the operator, and the operator may make changes to the operating parameters of the windrower 510 and/or the header 514. Changing operating parameters of a windrower 510 or header 514 based on information about the crop is described in more detail in U.S. Provisional Patent Application 63/015,183, "Agricultural Machines and Methods for Controlling Windrow Properties," filed Apr. 24, 2020.

In some embodiments, the controller 517 may operate the windrower 510 autonomously or semi-autonomously. For example, the operator may set initial operating parameters, and may control steering and propulsion of the tractor 512. The controller 517 may adjust the position of the swathboard 524 and/or the forming shield assembly 522 as measured crop conditions change, with or without input from the operator. In certain embodiments, the controller 517 may change a ground speed of the tractor 512 based on the measured crop conditions.

The measuring devices 106, 306 described herein may also be used with other crop-harvesting machines, such as balers, combines, etc.

Figure 6:
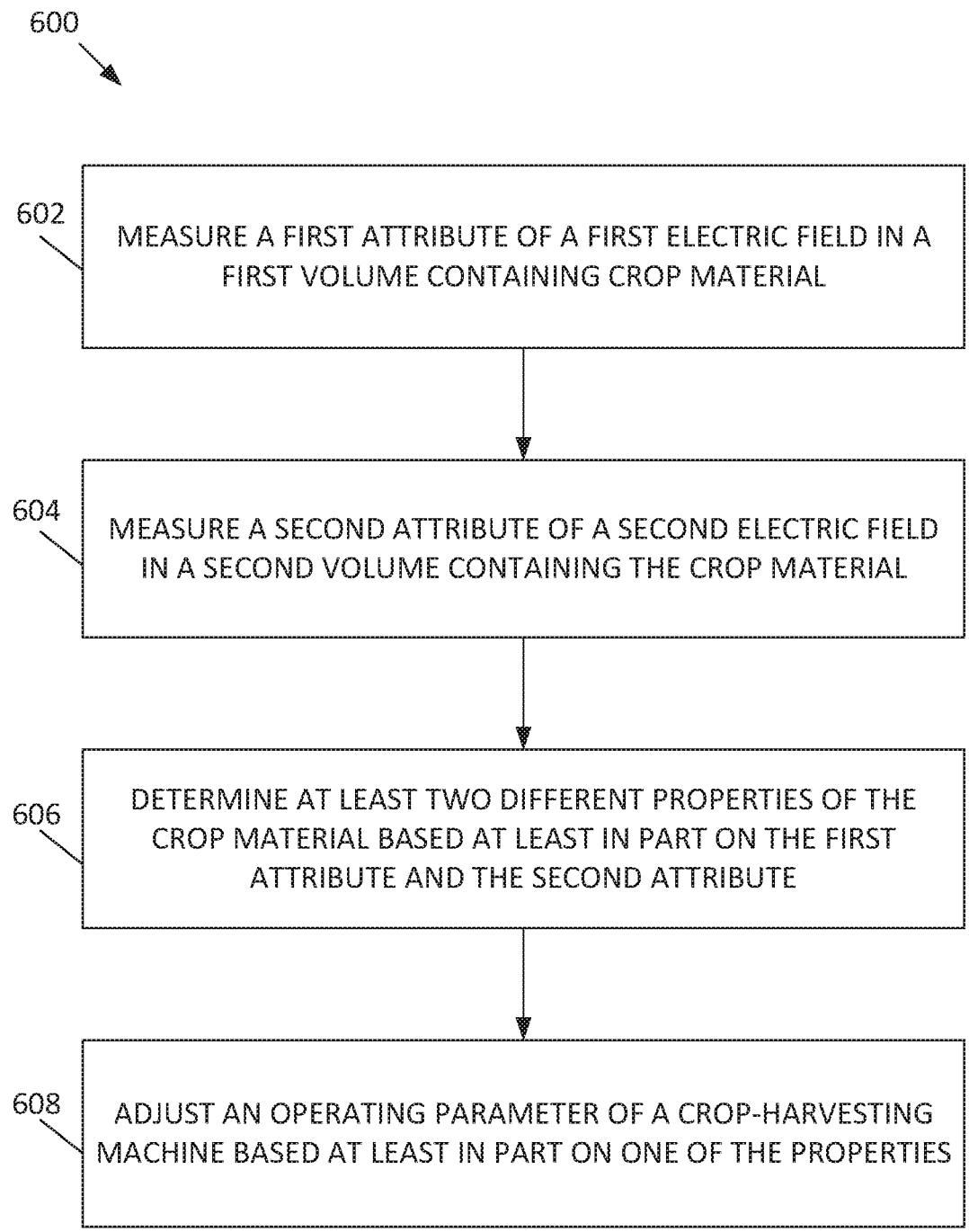
FIG. 6 is a simplified flow chart illustrating a method of measuring a harvested crop.

FIG. 6 is a simplified flow chart illustrating a method 600 of measuring a harvested crop. In block 602, a first attribute of a first electric field is measured in a first volume containing crop material. In block 604, a second attribute of a second electric field is measured in a second volume (which may be the same or different than the first volume). For example, the attributes measured may be resonant frequencies within the volumes. In block 606, at least two different properties of the crop material are determined based at least in part on the first attribute and the second attribute. For example, the properties determined may be permittivity, total moisture content, total mass, location (distance from any point on the sensor to the crop material, which can be used to determine crop orientation, crop distribution, velocity of crop material, etc.), density, percentage moisture, mass flow, and/or total moisture flow. The properties may be determined as the crop material is harvested by an agricultural machine. In block 608, an operating parameter of a crop-harvesting machine is adjusted based at least in part on one of the properties. For example, one or more of the properties may be reported to a controller that operates the agricultural machine, and used by the controller to change the operating parameter.

Figure 7:
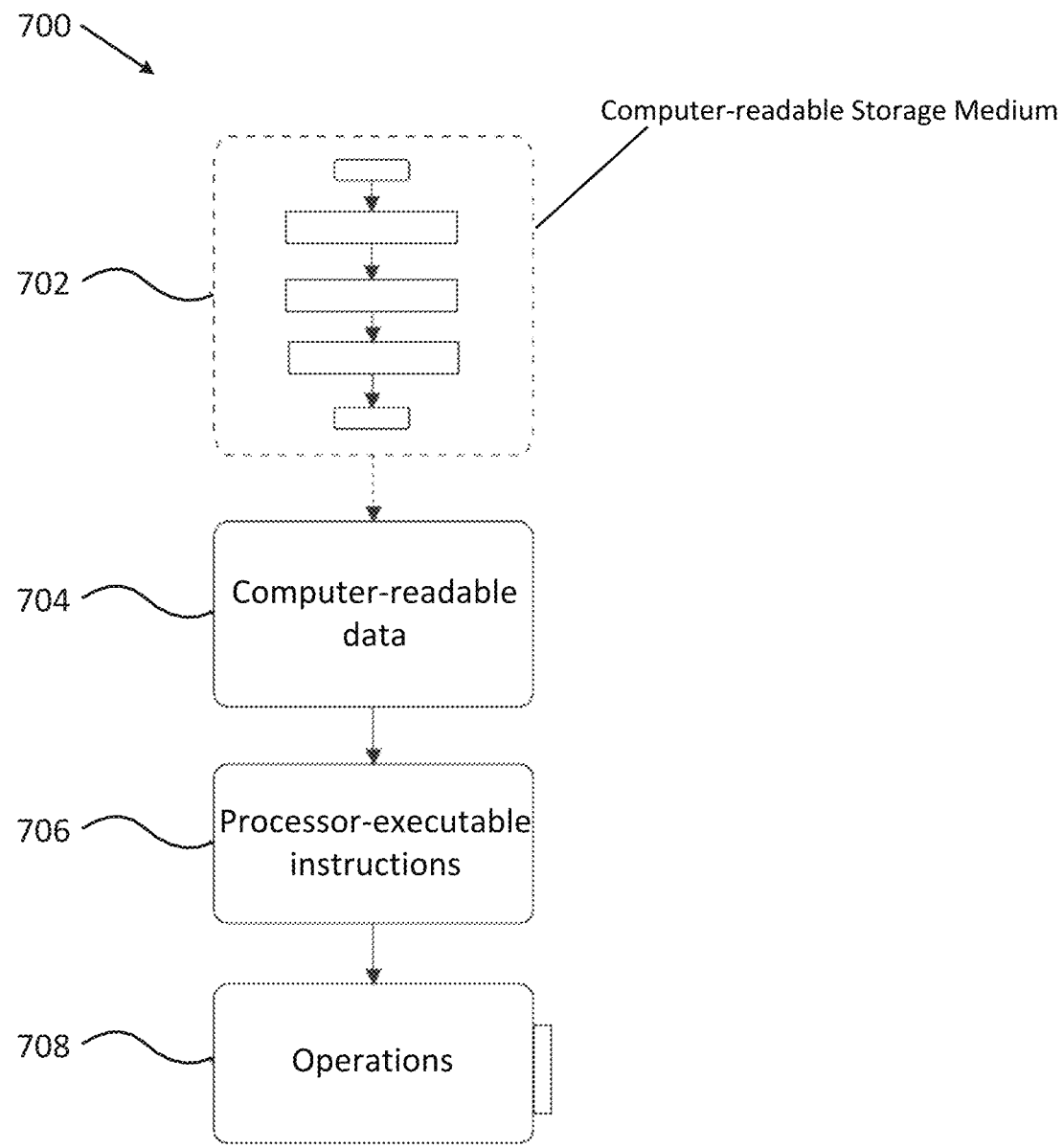
FIG. 7 illustrates an example computer-readable storage medium comprising processor-executable instructions configured to embody one or more of the methods of measuring a harvested crop, such as the method illustrated in FIG. 6.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 7, wherein an implementation 700 includes a computer-readable storage medium 702 (e.g., a flash drive, CD-R, DVD-R, application-specific integrated circuit (ASIC), field-programmable gate array (FPGA), a platter of a hard disk drive, etc.), on which is computer-readable data 704. This computer-readable data 704 in turn includes a set of processor-executable instructions 706 configured to operate according to one or more of the principles set forth herein. In some embodiments, the processor-executable instructions 706 may be configured to cause a computer associated with the windrower 510 (FIG. 5) to perform operations 708 when executed via a processing unit, such as at least some of the example method 600 depicted in FIG. 6. In other embodiments, the processor-executable instructions 706 may be configured to implement a system, such as at least some of the example windrower 510 depicted in FIG. 5. Many such computer-readable media may be devised by those of ordinary skill in the art that are configured to operate in accordance with one or more of the techniques presented herein.

Additional non limiting example embodiments of the disclosure are described below.

Embodiment 1: A method of measuring a harvested crop, the method comprising measuring a first attribute of a first electric field in a first volume containing crop material, measuring a second attribute of a second electric field in a second volume containing crop material, and determining at least two different properties of the crop material based at least in part on the first attribute and the second attribute.

Embodiment 2: The method of Embodiment 1, wherein determining at least two different properties of the crop material comprises measuring at least two properties selected from the group consisting of total moisture content, total mass, location, density, and percentage moisture.

Embodiment 3: The method of Embodiment 1 or Embodiment 2, wherein determining at least two different properties of the crop material comprises measuring mass flow and total moisture flow.

Embodiment 4: The method of any one of Embodiment 1 through Embodiment 3, wherein measuring the first attribute and measuring the second attribute each comprise measuring an apparent load on a transmitter generating the first electric field and the second electric field.

Embodiment 5: The method of any one of Embodiment 1 through Embodiment 4, wherein measuring the first attribute and measuring the second attribute each comprise measuring a permittivity of the crop material.

Embodiment 6: The method of any one of Embodiment 1 through Embodiment 5, wherein determining at least two different properties of the crop material comprises determining at least two different properties as the crop material is harvested by an agricultural machine.

Embodiment 7: The method of any one of Embodiment 1 through Embodiment 6, further comprising adjusting an operating parameter of a crop-harvesting machine based at least in part on one of the at least two different properties.

Embodiment 8: The method of any one of Embodiment 1 through Embodiment 7, further comprising reporting at least one of the at least two different properties to a controller configured to change an operating parameter of a crop-harvesting machine.

Embodiment 9: The method of any one of Embodiment 1 through Embodiment 8, wherein determining at least two different properties of the crop material comprises measuring a resonant frequency of crop material within the first electric field and the second electric field.

Embodiment 10: The method of Embodiment 9, wherein measuring a resonant frequency of a transmitter generating the first electric field and the second electric field comprises measuring a change in the resonant frequency of the crop material.

Embodiment 11: The method of any one of Embodiment 1 through Embodiment 10, wherein the second volume is coextensive with the first volume.

Embodiment 12: The method of any one of Embodiment 1 through Embodiment 10, wherein the second volume partially overlaps the first volume.

Embodiment 13: The method of any one of Embodiment 1 through Embodiment 10, wherein the second volume comprises a sum of the first volume and another volume.

Embodiment 14: A non-transitory computer-readable storage medium, the computer-readable storage medium including instructions that when executed by a computer, cause the computer to perform the method of any one of Embodiment 1 through Embodiment 13.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various crop-harvesting machine types and configurations.

What is claimed is:

1. A method of measuring a harvested crop, the method comprising:
   generating, via a measuring device comprising a plurality of electrodes, a first electric field having a first volume containing a first portion of a crop material;
   measuring a first attribute of the first electric field;
   changing one or more electrical connections of at least one electrode of the plurality of electrodes to change the at least one electrode from a grounded electrode to a source electrode;
   responsive to changing the one or more electrical connections of the at least one electrode of the plurality of electrodes, generate, via the measuring device, a second electric field having a second volume containing a second portion of the crop material;
   measuring a second attribute of the second electric field; and
   determining at least two different properties of the crop material based at least in part on the first attribute and the second attribute.

2. The method of claim 1, wherein determining at least two different properties of the crop material comprises measuring at least two properties selected from the group consisting of total moisture content, total mass, location, density, and percentage moisture.

3. The method of claim 1, wherein determining at least two different properties of the crop material comprises measuring mass flow and total moisture flow.

4. The method of claim 1, wherein measuring the first attribute and measuring the second attribute each comprise measuring an apparent load on a transmitter generating the first electric field and the second electric field.

5. The method of claim 1, wherein measuring the first attribute and measuring the second attribute each comprise measuring a permittivity of the crop material.

6. The method of claim 1, wherein determining at least two different properties of the crop material comprises determining at least two different properties as the crop material is harvested by an agricultural machine.

7. The method of claim 1, further comprising adjusting an operating parameter of a crop-harvesting machine based at least in part on one of the at least two different properties.

8. The method of claim 1, further comprising reporting at least one of the at least two different properties to a controller configured to change an operating parameter of a crop-harvesting machine.

9. The method of claim 1, wherein determining at least two different properties of the crop material comprises measuring a resonant frequency of the crop material within the first electric field and the second electric field.

10. The method of claim 9, wherein measuring a resonant frequency of the crop material within the first electric field and the second electric field comprises measuring a change in the resonant frequency of the crop material.

11. The method of claim 1, wherein the second volume is coextensive with the first volume.

12. The method of claim 1, wherein the second volume partially overlaps the first volume.

13. The method of claim 1, wherein the second volume comprises a sum of the first volume and another volume.

14. A non-transitory computer-readable storage medium, the computer-readable storage medium including instructions that when executed by a computer, cause the computer to perform the method of claim 1.

* * * * *